(12) United States Patent
Kim et al.

(10) Patent No.: US 7,270,290 B2
(45) Date of Patent: Sep. 18, 2007

(54) MAGNETIC RECORDING AND REPRODUCING APPARATUS AND DRIVING METHOD THEREOF

(75) Inventors: Jun-young Kim, Suwon-si (KR);
Byeng-bae Park, Aansan-si (KR);
Jeong-hyeob Oh, Anyang-si (KR);
Seung-woo Lee, Suwon-si (KR);
Hyeong-seok Choi, Suwon-si (KR);
Jae-hoon Sim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/152,140

(22) Filed: Jun. 15, 2005

(65) Prior Publication Data

US 2006/0180627 A1 Aug. 17, 2006

(30) Foreign Application Priority Data

Jun. 18, 2004 (KR) ............... 10-2004-0045304
Aug. 10, 2004 (KR) ............... 10-2004-0062693

(51) Int. Cl.
*G03B 23/02* (2006.01)

(52) U.S. Cl. ............... 242/346.1; 242/354; 360/85

(58) Field of Classification Search ............... 242/346, 242/346.1, 354; 360/85, 95
See application file for complete search history.

(56) References Cited

U.S. PATENT DOCUMENTS 5,025,332 A 6/1991 Tsuchida

| | | | |
|---|---|---|---|
| 5,524,806 A * | 6/1996 | Asakura et al. | 242/354 |
| 5,774,300 A * | 6/1998 | Eum | 360/85 |
| 5,943,181 A * | 8/1999 | Son et al. | 360/85 |
| 6,325,264 B1 * | 12/2001 | Omosako | 242/354 |

FOREIGN PATENT DOCUMENTS

| JP | 04-335242 | 11/1992 |
|---|---|---|
| JP | 06-060509 | 3/1994 |
| JP | 06-243545 | 9/1994 |
| JP | 08-171759 | 7/1996 |
| KR | 1992-0000039 | 12/1989 |
| KR | 20-0142342 | 4/1996 |
| KR | 10-1999-0078029 | 10/1999 |

* cited by examiner

*Primary Examiner*—William A. Rivera
(74) *Attorney, Agent, or Firm*—Roylance, Abrams, Berdo & Goodman, L.L.P.

(57) ABSTRACT

A magnetic recording and reproducing apparatus is provided which comprises a deck mounted with a drum motor and a capstan shaft, a main sliding member slidably installed on the deck and being driven by a driving force of the drum motor, a pivot lever rotatably installed on the deck and supporting a pinch roller for guiding a tape to be in contact with the capstan shaft, a review arm rotatably installed on the deck and being connected to the pivot lever by means of an elastic member, and a compressing lever for connecting the review arm and the sliding member. The compressing lever is driven by a driving force from the sliding member, and compresses the review arm in a direction such that the elastic member is stretched. The pivot lever is then rotated by the stretched elastic member and adheres the pinch roller closely to the capstan shaft.

16 Claims, 9 Drawing Sheets

MAGNETIC RECORDING AND REPRODUCING APPARATUS AND DRIVING METHOD THEREOF

CROSS-REFERENCE TO RELATED APPLICATIONS

This application claims the benefit under 35 U.S.C. §119(a) of Korean Patent Application Nos. 10-2004-0045304 and 10-2004-0062693, filed on Jun. 18, 2004 and Aug. 10, 2004, respectively, the entire disclosures of which are each hereby incorporated by reference.

BACKGROUND OF THE INVENTION

1. Field of the Invention

The present invention relates to a magnetic recording and reproducing apparatus. More specifically, the present invention relates to a magnetic recording and reproducing apparatus for recording and reproducing information by scanning a running magnetic tape unreeled from a tape cassette, and a driving method thereof.

2. Description of the Related Art

In general, a magnetic recording and reproducing apparatus as shown in FIG. 1, includes a deck 10 for supporting a head drum 11 which scans a magnetic tape (not shown) that is running and thus, records or reads information on or from the magnetic tape, and a sub-deck 20 which is slidably installed on the deck 10 for movement in loading/unloading directions. The deck 10 includes a guide means for pulling the magnetic tape out of a tape cassette placed in reel tables 21 and 22 of the sub deck 20, and for guiding the tape to run (or travel) on a designated tape path via the head drum 11.

Typically, the guide means includes a tension pole 13a, a pair of pole base assemblies 14 and 15, a capstan shaft 16, a pinch roller 17a, and a review pole 18a.

The tension pole 13a is supported by a tension arm 13 interlocked therewith by the sliding motion of the sub-deck 20, and adjusts the tension of a tape supplied from a feed reel (or a supply reel) of the tape cassette. For example, in play mode the tension pole 13a actively moves in correspondence to the tension of the running tape in order to adjust its tension. In stop mode, the tension arm 13 and the tension pole 13a are interlocked and move together by means of a cam gear that is rotated by the driving force of a drum motor 12, and the position of the tension pole 13a is controlled to release the tension of the tape.

The pole base assemblies 14 and 15 are interlocked with the drum motor-driven cam gear 19, and are movably installed in the loading/unloading directions. That is, during the tape loading process, the pole base assemblies 14 and 15 draw out the tape and guide a length of the tape to be wound around the head drum 11. During the tape unloading process, the pole base assemblies 14 and 15 return to their original position.

The capstan shaft 16 is driven by a capstan motor (not shown) installed in the deck 10. When the capstan shaft 16 rotates, the tape running between the pinch roller 17a and the capstan shaft 16 is guided. Here, the driving force from the capstan motor is transmitted to reel tables 21 and 22, respectively, for driving a tape reel of the tape cassette.

The pinch roller 17a is installed on a pinch arm 17 that is rotatably mounted to the deck 10. The pinch arm 17 rotates clockwise during the tape loading process, and as a result, the pinch roller 17a moves towards the capstan shaft 16. When the tape is running, the pinch arm 17 is compressed further in the clockwise direction to press the tape closely to the capstan shaft 16. The pinch arm 17 moves toward the capstan shaft 16 when the sub-deck 20 is loaded, and then returns to its original position during the unloading of the sub-deck 20 with the aid of a restoring force of a spring (not shown).

In addition, the deck 10 can further include a main sliding member (not shown) for controlling the motion of the pinch arm 17, and a compressing member (not shown) interlocked with the main sliding member. The main sliding member is also engaged with the cam gear 19, so that when the main sliding member slides back and forth, the compressing member and the pinch arm 17 all move together. The constitution of the main sliding member and the compressing member is a technique well-known to those skilled in the art and accordingly, a detailed description thereof is omitted for conciseness.

The review pole 18a is installed proximate to the pinch roller 17a to guide the running operation of the tape wound around a take-up reel of the tape cassette. The review pole 18a is supported by a review arm 18 that is rotatably installed in the deck 10. Similar to the pinch arm 17, the review arm 18 is typically interlocked with the sub-deck 20 or the main sliding member.

However, the conventional magnetic recording and reproducing apparatus with the above constitution has several problems. For example, it requires a large number of components for manufacture, and has a highly complicated structure. And these problems also resulted in large weight and high cost of manufacture. To overcome these problems, studies have been actively done to simplify the structure of the magnetic recording and reproducing apparatus by deleting as many unnecessary components as possible. For instance, the development of a new structure having only one deck with no sub-deck is one proposed improvement. Also, attempts have been made to delete some components of certain parts, such as the guide means, and thus simplify the structure of the guide means for guiding the tape or adjusting the tension of the tape.

Accordingly, a need exists for a system and method providing a simple structure for a magnetic recording and reproducing apparatus having fewer components, yet being able to control the tension of the tape and the driving of the pinch roller.

SUMMARY OF THE INVENTION

It is, therefore, an object of the present invention to provide a magnetic recording and reproducing apparatus having a reduced number of components and an improved yet simple structure.

To achieve the above and other objects and advantages, a magnetic recording and reproducing apparatus is provided including a deck mounted with a drum motor and a capstan shaft, and a cam gear driven by a driving force from a main sliding member and the drum motor for transmitting the driving force to the sliding member, thereby adhering a loaded tape to the capstan shaft. The apparatus further includes a pivot lever rotatably installed on the deck supporting a pinch roller for guiding a tape to be in contact with the capstan shaft, and a review arm rotatably installed on the deck and being connected to the pivot lever by means of an elastic member. The apparatus further includes a compressing lever for connecting the review arm and the sliding member, wherein the compressing lever is driven by a driving force from the sliding member and compresses the review arm in a direction where the elastic member is stretched, and wherein the pivot lever rotates by the stretched elastic member and adheres the pinch roller closely to the capstan shaft.

The pivot lever and the review arm may have the same rotation axis.

The compressing lever may include a coupling projection, and the main sliding member may comprise a first cam opening for the coupling projection to be inserted into, whereby during the motion of the main sliding member, the coupling projection slides along the first cam opening and may rotate the compressing lever.

The review arm may include a compressing projection, and the compressing lever may comprise a second cam opening for the compressing projection to be inserted into, whereby during the rotation of the compressing lever the compressing projection slides along the second cam opening and may rotate the review arm.

The compressing lever may further include a pivot pin that is rotatably inserted into one end of the deck, and the coupling projection may be inserted between the pivot pin and the second cam opening.

One end of the review arm may be combined coaxially with the pivot lever, and the other end of the review arm may include a review pole for guiding the tape.

According to another aspect of the present invention, a driving method of a magnetic recording and reproducing apparatus is provided and includes the steps of moving a pivot lever mounted with a pinch roller and loading (or reeling) a tape to a capstan shaft side, and compressing the pivot lever to adhere the tape closely to the capstan shaft, thereby providing a tension to the tape.

The loading step may include the sub-steps of rotating a compressing lever installed on a deck supporting the capstan shaft, rotating a review arm connected to the compressing lever in one direction, and rotating a pivot lever connected to the review arm by means of an elastic member.

The pivot lever may rotate about the same rotation axis with respect to the review arm.

The rotations of the review arm and the pivot lever may occur simultaneously.

The compressing step may include the sub-steps of applying tension to the tape by separating the review arm from the pivot member and moving the review pole supported by the review arm, and elastically compressing the pivot member to the capstan shaft side by means of an elastic member that is stretched by the separation of the review arm.

At the tension applying step, the review arm may be rotated more than the pivot member to separate the pivot member and the review arm.

The tension on the tape may be released by releasing the adherence force between the tape and the capstan shaft.

The tension releasing step may be performed in the tape stop mode.

The tension releasing step may include the sub-steps of returning the compressing lever to a designated angle of an original position thereof on the deck with respect to the capstan shaft, returning the review arm connected to the compressing lever to the pivot lever side and supporting the tape-supporting review pole, and releasing tension of the elastic member connecting the pivot lever and the review arm, thereby releasing a compressing force of the pinch roller to the capstan shaft.

According to another aspect of the present invention, a driving method of a magnetic recording and reproducing apparatus comprising a pinch roller driven by a driving force from a drum motor to rotate a pivot lever and adhere a loaded tape on a deck closely to a capstan shaft is provided and includes the steps of rotating a compressing lever, rotating a review arm connected to the compressing lever in one direction, rotating the pivot lever connected to the review arm by means of an elastic member, and adhering the tape closely to the capstan shaft by means of the pinch roller installed in the pivot lever.

The method may further include the steps of stretching the elastic member by means of the review arm, and pulling the pivot lever by means of the elastic member.

BRIEF DESCRIPTION OF THE DRAWINGS

The above aspects and features of the present invention will become more apparent by describing certain embodiments of the present invention with reference to the accompanying drawings, in which.

Throughout the drawings, like reference numerals will be understood to refer to like parts, components and structures.

DETAILED DESCRIPTION OF EXEMPLARY EMBODIMENTS

Figure 1:
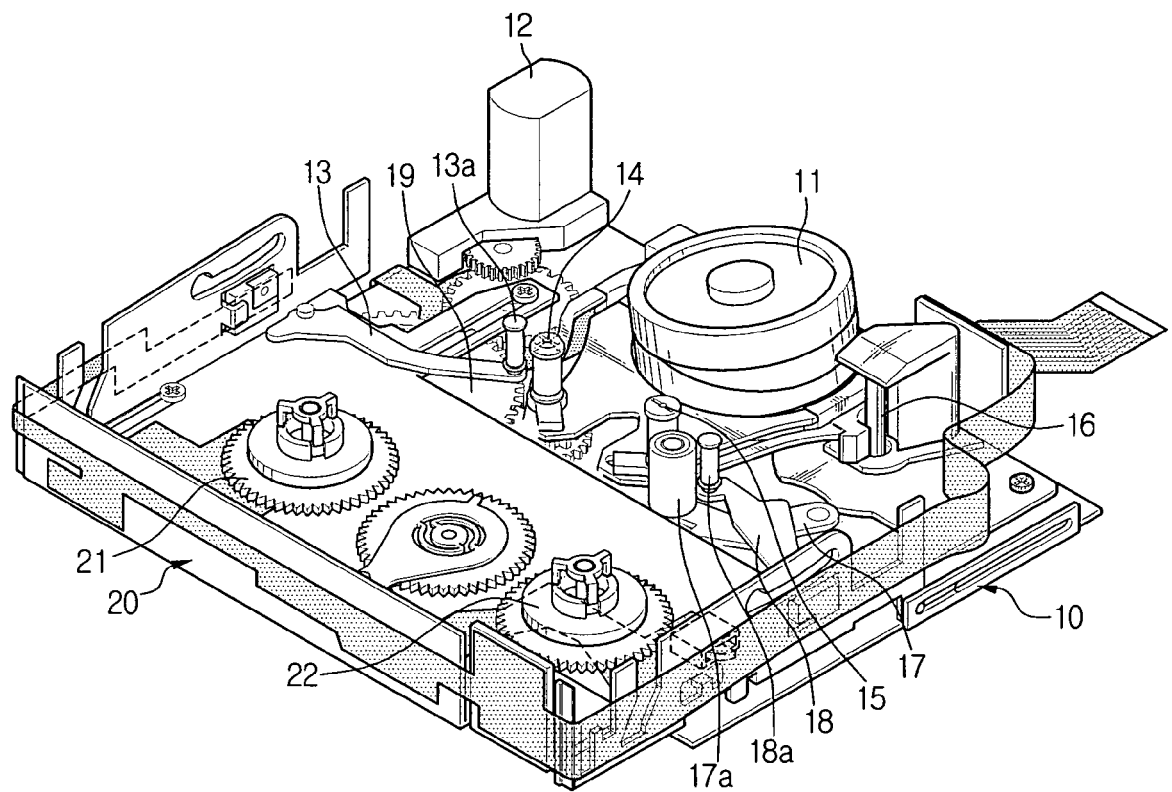
FIG. 1 is a plan view of a conventional magnetic recording and reproducing apparatus.

Exemplary embodiments of the present invention will be described herein below with reference to the accompanying drawings.

In the following description, same drawing reference numerals are used for the same elements even in different drawings. The matters defined in the description, such as detailed construction and element descriptions, are provided to assist in a comprehensive understanding of the invention. Also, functions or constructions well known to those skilled in the art are omitted for clarity and conciseness.

Figure 2:
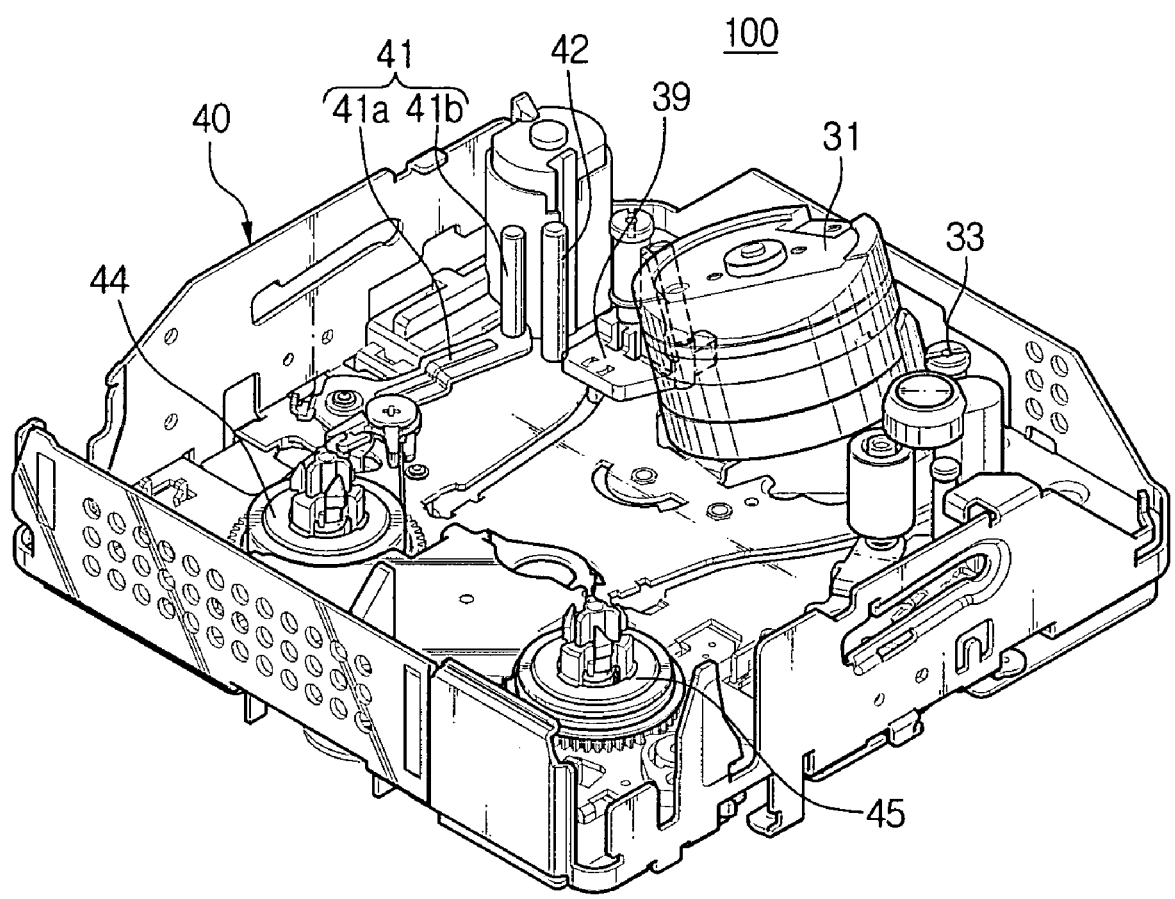
FIG. 2 is a perspective view of a magnetic recording and reproducing apparatus according to an exemplary embodiment of the present invention.
Figure 3:
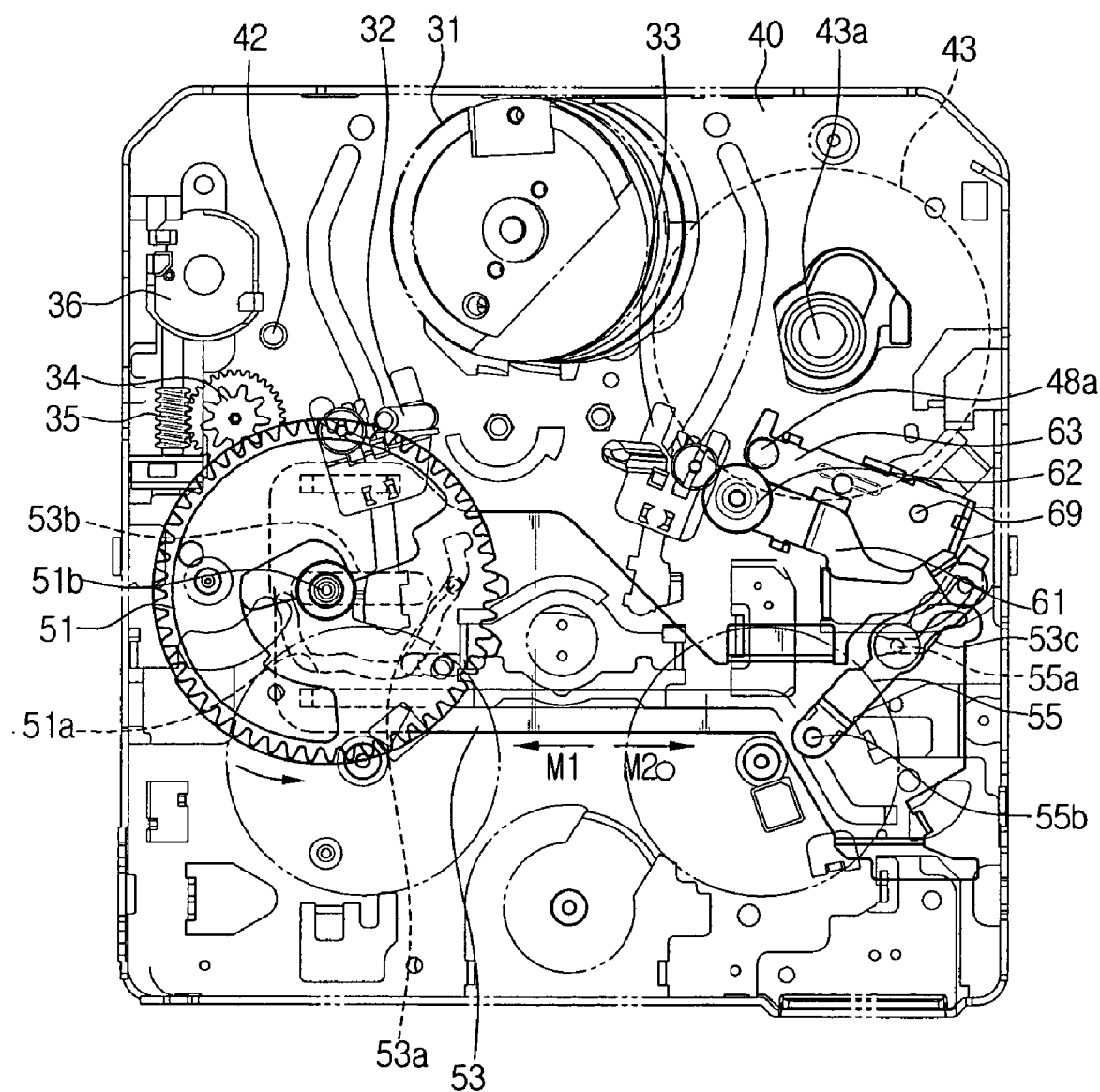
FIG. 3 is a plain view of a magnetic recording and reproducing apparatus according to an exemplary embodiment of the present invention.
Figure 4:
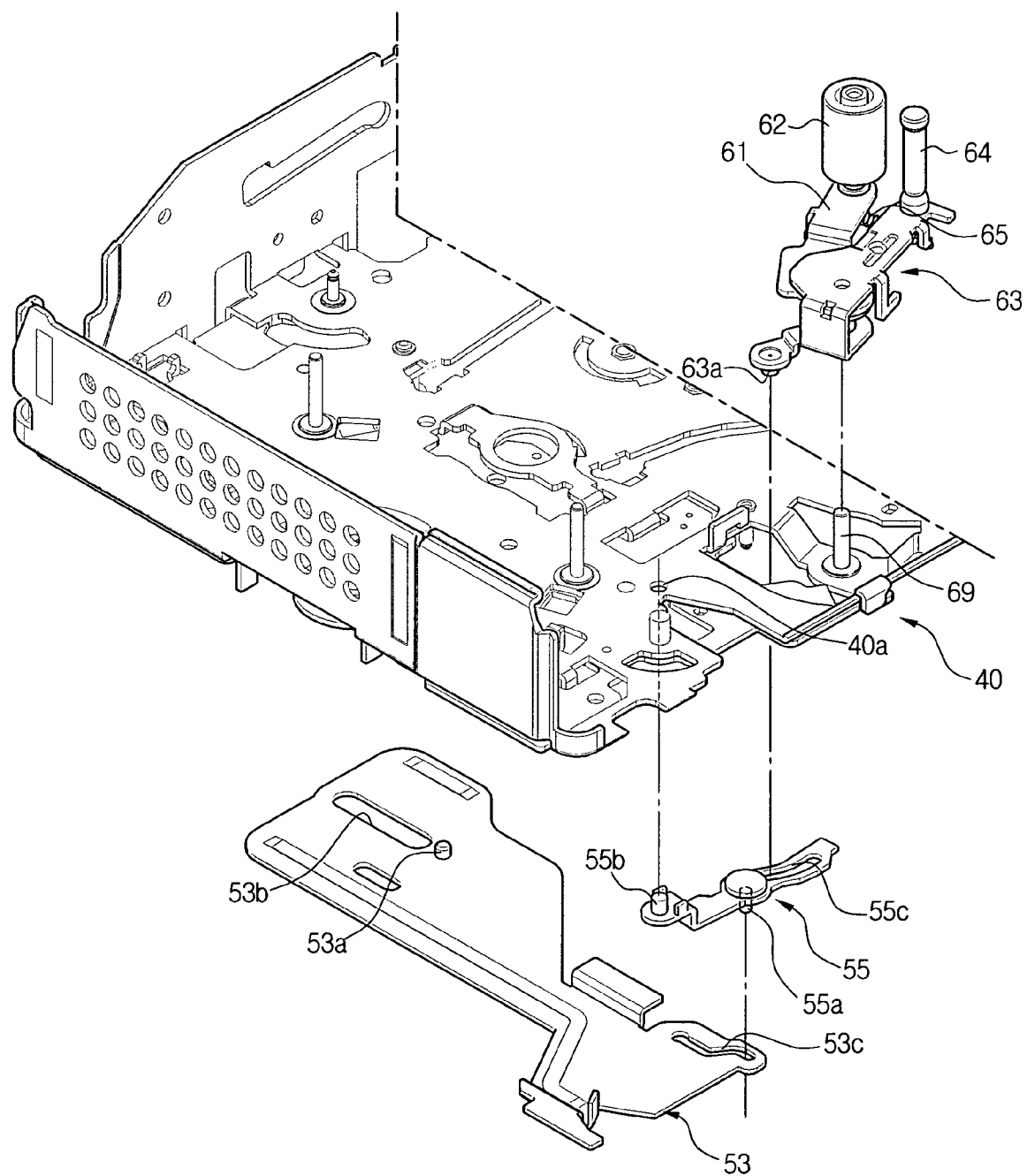
FIG. 4 is an exploded perspective view illustrating a relation between a deck, main sliding member, pressure lever, review arm, elastic member, and pivot lever according to an exemplary embodiment of the present invention.

Referring to FIGS. 2, 3 and 4, a magnetic recording and reproducing apparatus 100 is provided in accordance with an exemplary embodiment of the present invention and includes a deck 40 mounted with a rotary head drum 31, a cam gear 51, a main sliding member 53, a compressing lever 55, a pivot lever 61, a review arm 63, and an elastic member 65.

The deck 40 is provided as a single unit, without a sub-deck as in the conventional devices. Disposed upon the deck 40 is a pair of pole base assemblies 32 and 33, each being movably installed, for loading a length of the magnetic tape to the head drum, and a drum motor 36 for providing a driving force to the cam gear 51 through connecting gears 34 and 35.

In addition to the pole base assemblies 32 and 33 and the drum motor 36, a tension pole unit 41 for guiding the running operation of a loaded tape, a fixed pole 42, and a capstan motor 43 are also installed on the deck 40. The tension pole unit 41 includes a tension arm 41a that is rotatably engaged with a cam gear 51, and a tension pole 41b installed at the end of the tension arm 41a for guiding the tape. The tension pole unit 41 actively moves in relation with the tension of the running tape in order to adjust its tension.

The capstan motor 43 includes a capstan shaft 43a for guiding the tape. The capstan motor 43 provides a driving force to reel tables 44 and 45 where two reels of the tape are seated. Specifically, the reel table 44 on the left side is driven for supplying the tape, and the reel table 45 on the right side is driven for taking up the tape.

The cam gear 51 is installed on the deck 40 and is rotated by a driving force transmitted by means of the connecting gear 35. The cam gear 51 includes a cam groove 51a into which a cam pin 53a of the main sliding member 53 is inserted. Along with the rotation of the cam gear 51, the cam pin 53a of the main sliding member 53 is interlocked with the cam groove 51a, and as a result, the main sliding member 53 selectively slides in an M1 or M2 direction. Here, the main sliding member 53 includes a guide slit 53b coupled to the rotation axis 51b of the cam gear 51.

As shown in FIG. 4, the main sliding member 53 also includes a first cam opening 53c into which a coupling projection 55a of the compressing lever 55 is inserted.

With respect to the coupling projection 55a, a pivot pin 55b is located at one end of the compressing lever 55, and a second cam opening 55c is located at the other end of the compressing lever 55. The pivot pin 55b is rotatably inserted into an axis opening 40a of the deck 40. Also, the compressing projection 63a of the review arm 63 is inserted into the second cam opening 55c.

Therefore, when the main sliding member 53 slides in the M2 direction shown in FIG. 3, the coupling projection 55a moves along the first cam opening 53c, and the compressing lever 55 is rotated counterclockwise with respect to the pivot pin 55b. The compressing projection 63a of the review arm 63 is interlocked with the second cam opening 55c and moving together, moves the review arm 63 in the R direction shown in FIG. 5A.

The review arm 63 is rotatably installed with the rotation axis 69 on the deck 40. A review pole 64 is provided on a free end portion of the review arm 63 for providing fixed tension to a tape for support.

The pivot lever 61 is coaxially installed with the review arm 63. That is, the pivot lever 61 is also rotatably coupled with the rotation axis 69 of the deck 40. A pinch roller 62 is rotatably installed on the pivot lever 61 for guiding the loaded tape into contact with the capstan shaft 43a.

Thus, the pivot lever 61 and the review arm 63 rotate with respect to the same rotation axis 69, and preferably, the pivot lever 61 is rotatably installed on the deck 40 at a certain distance apart from a lower portion of the review arm 63 in order to avoid interference from the review arm 63. Further, the pivot lever 61 and the review arm 63 are connected to each other by an elastic member 65.

When the elastic member 65 is stretched, the pivot lever 61 is pressed in the clockwise direction, and the pinch roller 62 is adhered closely to the capstan shaft 43a. To this end, the elastic member 65 is preferably comprised of a spring element, or an elastic or rubber material.

A driving method of the magnetic recording and reproducing apparatus 200 having the above structures will now be described in greater detail with reference to FIGS. 5A, 5B, 6A, 6B, and 7.

Figure 5A:
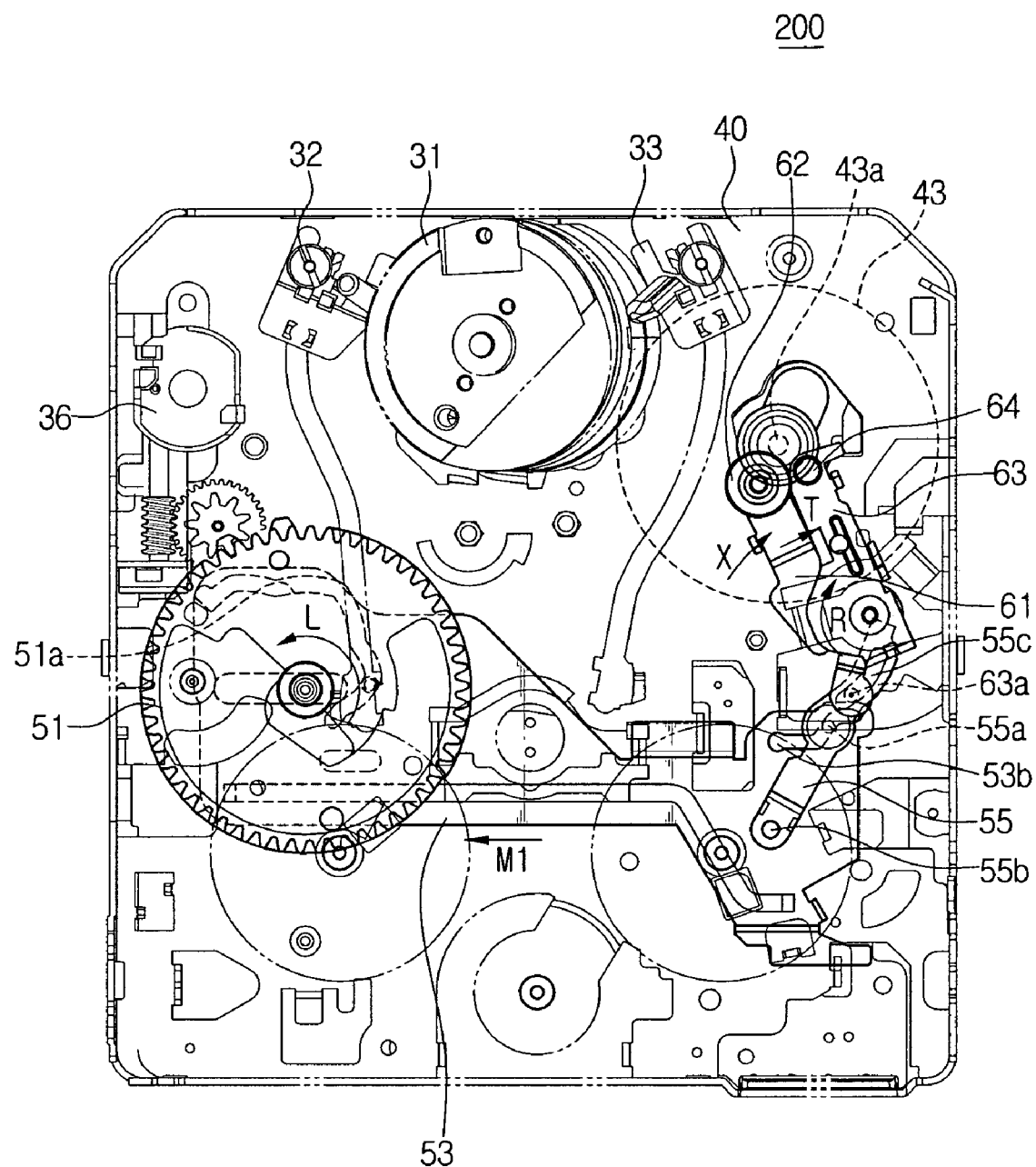
FIG. 5A to FIG. 6B illustrate plan views for describing an operation example of a magnetic recording and reproducing apparatus according to an exemplary embodiment of the present invention.

When a tape cassette is mounted on the deck 40, a loading mode driven by the drum motor 36 is executed at step (S10). That is, the cam gear 51 in the state shown in FIG. 5A rotates in the arrow direction L, and results in the main sliding member 53 moving in the M1 direction. Then, as shown in FIG. 5A, the compressing lever 55 rotates to a designated angle in the counterclockwise direction at step (S11). That is, as the main sliding member 53 moves in the M1 direction, the coupling projection 55a of the compressing lever 55 moves along the first cam opening 53b of the main sliding member 53. Accordingly, the compressing lever 55 rotates counterclockwise with respect to the pivot pin 55b.

Figure 5B:
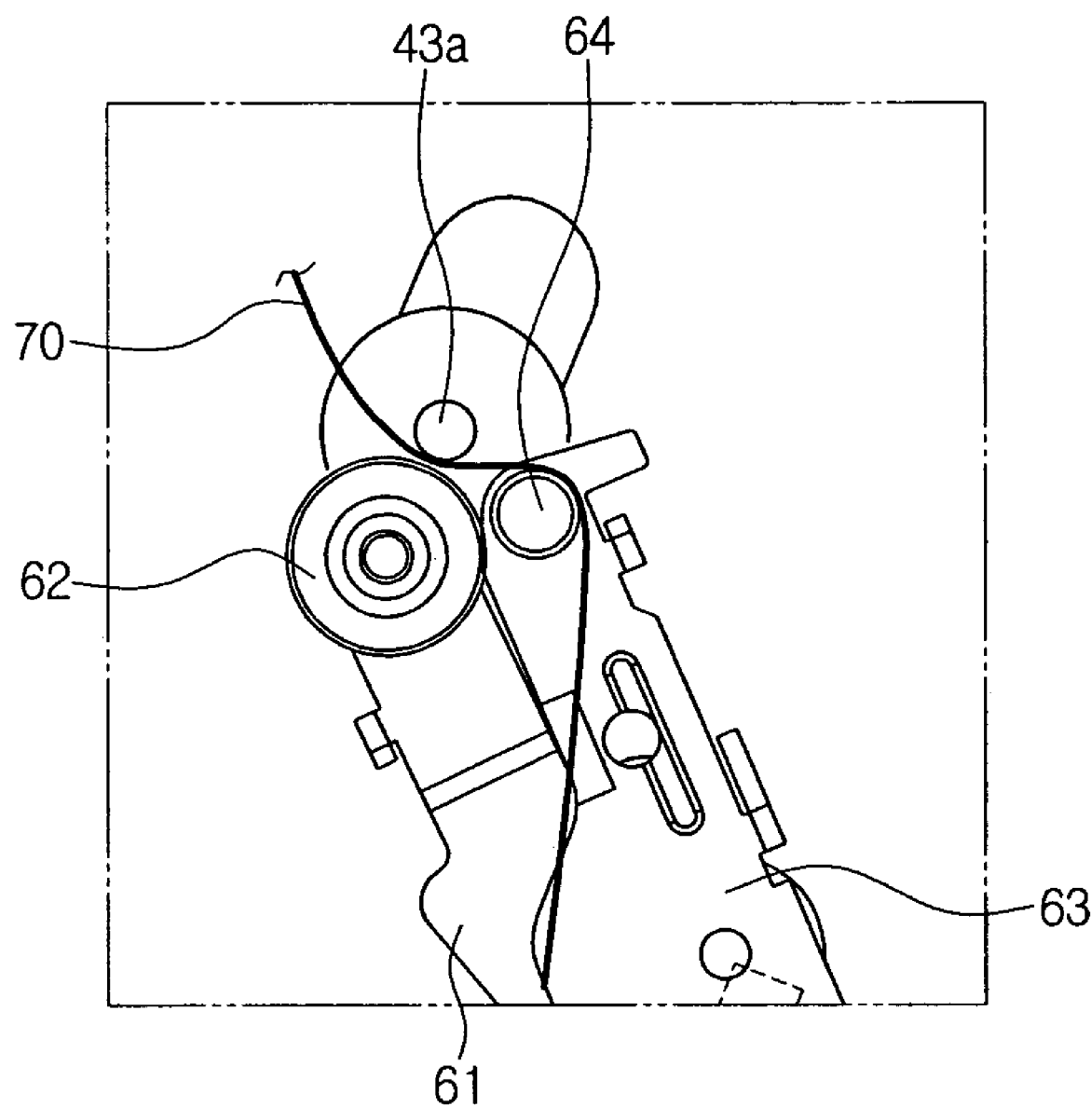

As the compressing lever 55 rotates to a designated angle in the counterclockwise direction, the review arm 63 and the pivot lever 61 rotate together in the R direction at step (S12). That is, the compressing projection 63a interlocked with the second cam opening 55c of the compressing lever 55 slides along the opening 55c, and as a result, the review arm 63 rotates in the clockwise R direction with respect to the rotation axis 69. Since the pivot lever 61 is closely adhered to the review arm 63 by means of the elastic member 65, the pivot lever 61 and the review arm 63 rotate together to a designated angle and pull the tape to the capstan shaft side. At this time, the tape 70 is not yet closely adhered to the capstan shaft 43a by means of the pinch roller 62 as shown in FIG. 5B. In addition, since the review pole 64 is positioned proximate to the pinch roller 62, tension from the review pole 64 is not yet applied to the tape 70 so the tape is released.

After being pulled out of the tape cassette, the loaded tape remains in stand-by mode until a play signal is input at step (S13) and the play mode is executed at step (S20).

To execute the play mode at step (S20), the main sliding member 53 in the state shown in FIG. 5A is slid as much as possible in the M1 direction to rotate the compressing lever 55 further in the counterclockwise direction at step (S21). Then as shown in FIG. 6A, the compressing lever 55 is rotated to the farthest counterclockwise direction.

Figure 6A:
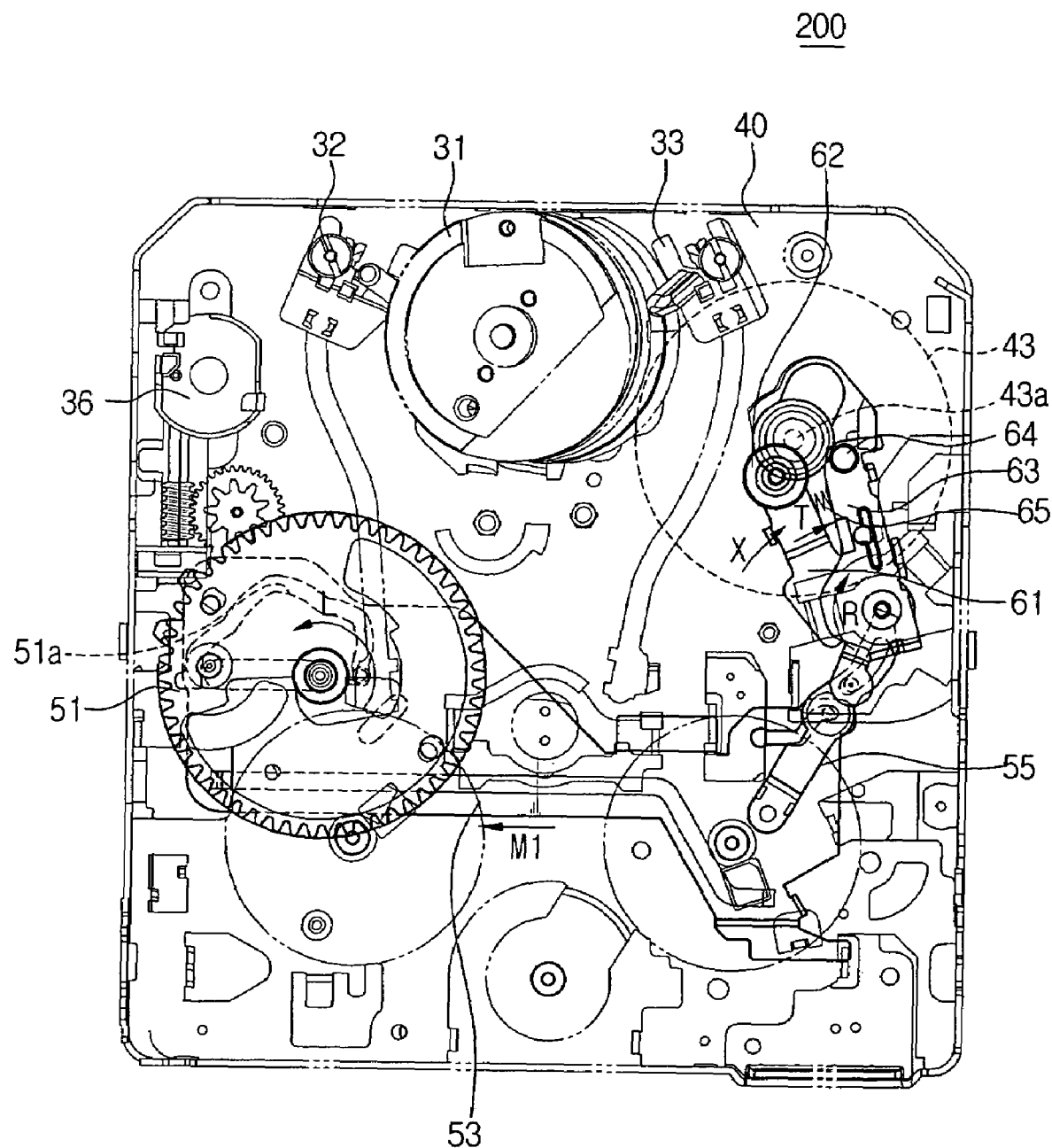
Figure 6B:
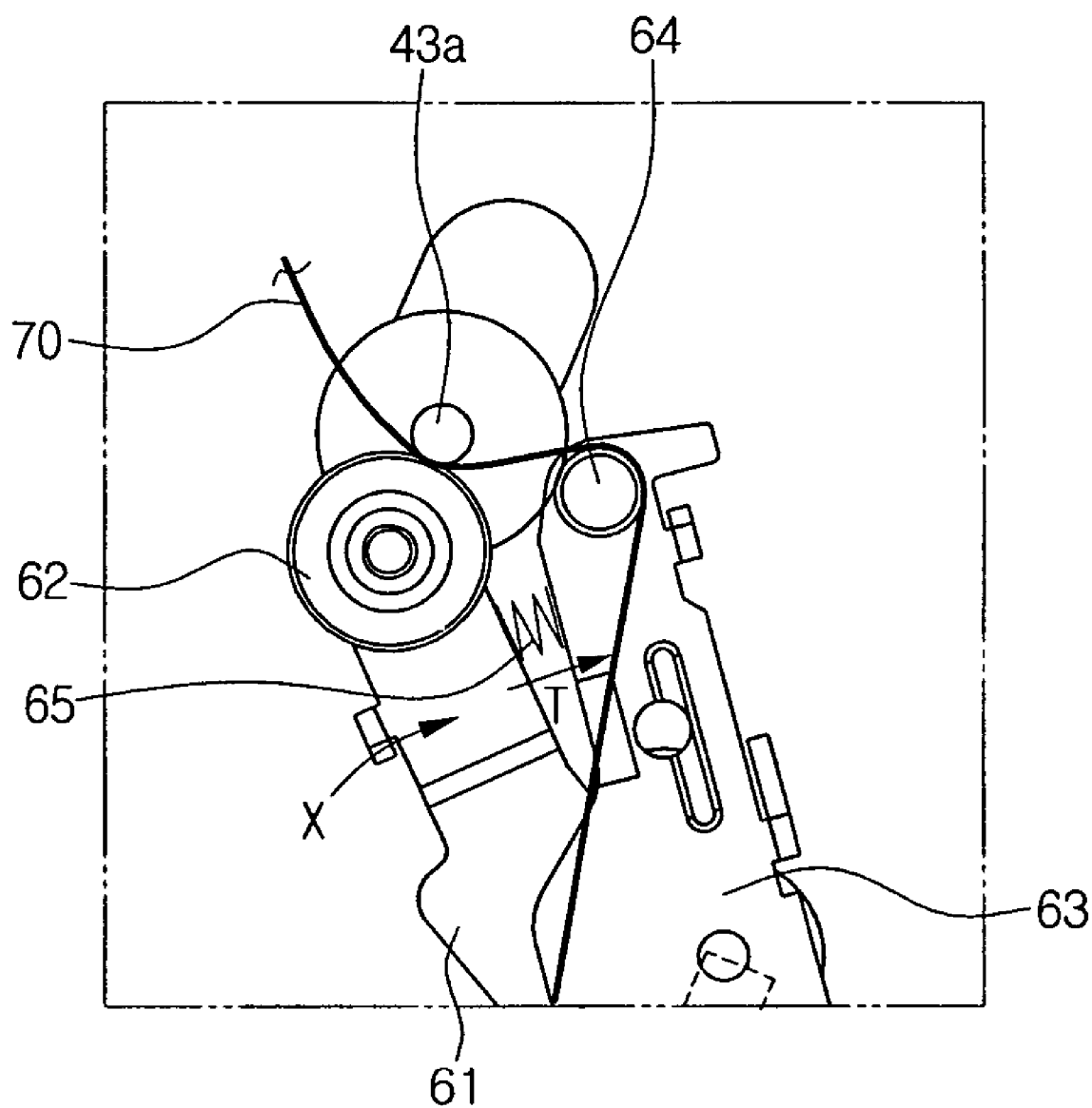
Figure 7:
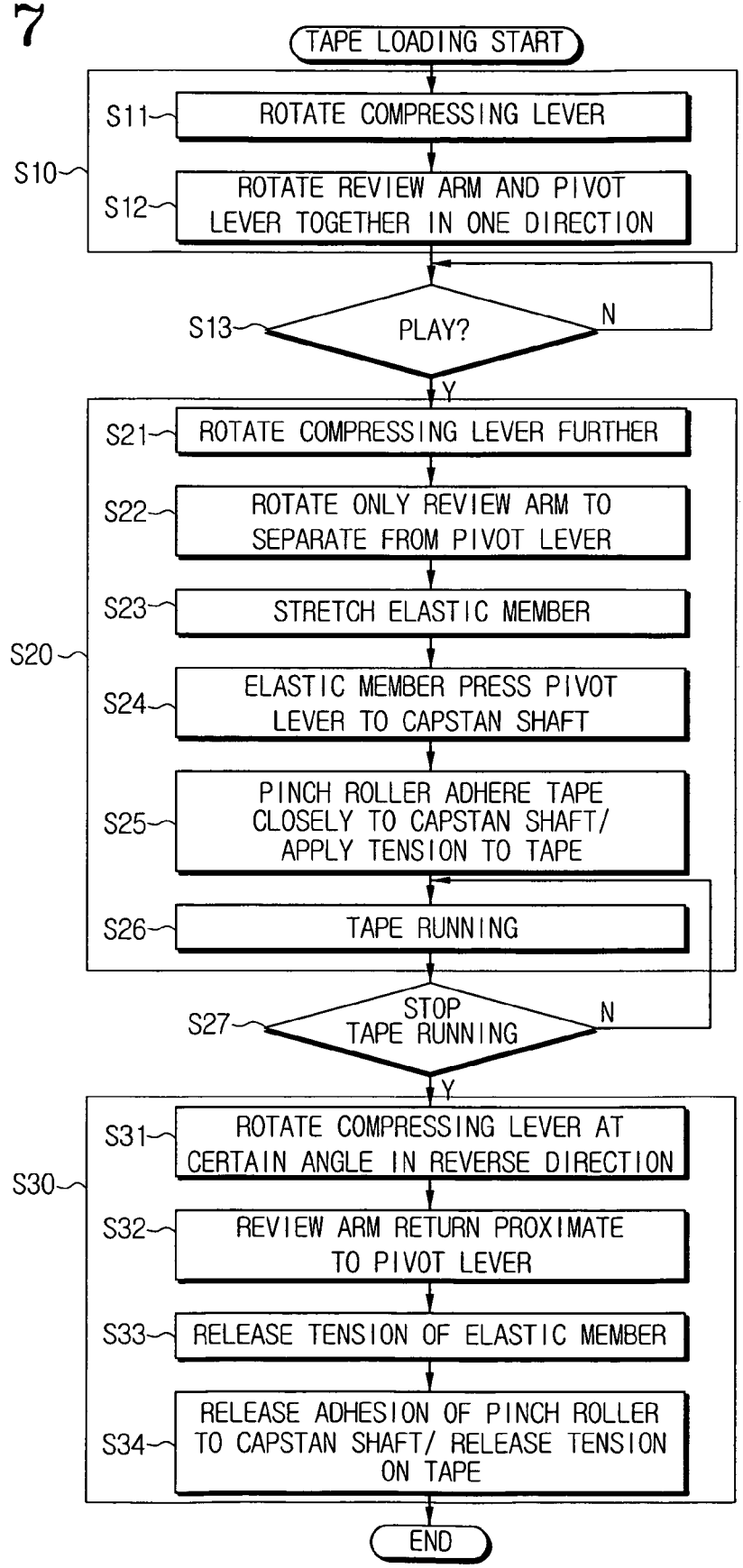
FIG. 7 is a flow chart describing a driving method of a magnetic recording and reproducing apparatus according to an exemplary embodiment of the present invention.

The review arm 63 in the state of FIG. 5A rotates further in the R direction as shown in FIG. 6A, thereby being spaced from the pivot lever 61 at step (S22). The elastic member 65 is stretched in the T direction by a distance between the review arm 63 and the pivot lever 61 at step (S23). The pivot member 61 is compressed in the X direction, that is, toward the capstan shaft 43a by the tension of the elastic member 65 at step (S24). Therefore, referring to FIG. 6B, the pinch roller 62 adheres the tape 70 closely to the capstan shaft 43a, and the review pole 64, being spaced from the pinch roller 62, provides a designated tension to the tape at step (S25).

In effect, the above-described steps (S21), (S22), (S23), (S24), and (S25) occur almost simultaneously. In the exemplary embodiment however, these steps are numbered in sequence to describe where the force is transmitted.

When the tape is adhered closely to the capstan shaft 43a by the applied tension, the tape starts running at step (S26). During the tape running at step (S26), information can be recorded or reproduced to or from the tape, respectively. At this time, the tension applied to the tape can be controlled by the tension pole unit 41, as shown in detail in FIG. 2.

Later, if a stop signal is input at step (S27) during the play mode of step (S20), the stop mode for stopping the tape is executed at step (S30). More specifically, in the stop mode the main sliding member 53 in the state of FIG. 6A is returned in the M2 direction by a designated distance, and the compressing lever 55 is rotated at an angle in the clockwise direction as shown in FIG. 5A at step (S31). The review arm 63 interlocked with the compressing lever 55 is then returned to a position proximate to the pivot lever 61 as shown in FIGS. 5A and 5B at step (S32). Therefore, the stretched elastic member 65 contracts, and the tension is released at step (S33). As a result, the adhesion of the pinch roller 62 to the capstan shaft 43a is released and at the same time, the tension provided from the review pole 64 to the tape is released at step (S34). In this way, it becomes possible in the stop mode at step (S30) to keep the tape from remaining in the tensed state and thus, to prevent any damage to the tape.

As described above, the exemplary embodiment of the magnetic recording and reproducing apparatus 200 of the present invention has a simplified structure in which, the review arm 63 is utilized to adhere the pinch roller 62 closely to the capstan shaft 43a.

In addition, the rotating motion of the review arm 63 can be controlled by means of the driving force of the main sliding member 53. This also makes it possible to adjust the tension on the tape in the stop mode. Therefore, the magnetic recording and reproducing apparatus according to an embodiment of the present invention no longer requires the additional control of numerous parts, such as requiring the cam gear to control the tension pole unit for example. Because the number of required components is decreased, the cost of manufacture of the magnetic recording and reproducing apparatus can be reduced.

In addition, a magnetic recording and reproducing apparatus according to an embodiment of the present invention uses only one deck without the sub-deck as in the conventional device. And, since the pivot lever and the review arm are installed coaxially, the driving force of the main sliding member can be used to control both. With this simplified structure, a number of components can be deleted, resulting in a significant decrease in the total weight and the cost of manufacture of the apparatus.

Moreover, according to an embodiment of the present invention, the pinch roller can be adhered closely to the capstan shaft by controlling the review arm that is driven by the driving force of the main sliding member.

Also, by controlling the rotating motion of the review arm, it becomes possible to release the tension on the tape in the stop mode.

Accordingly, the magnetic recording and reproducing apparatus of the present invention features fewer components and reduced costs of manufacture than the conventional devices. Therefore, a designing process for securing more space in the magnetic recording and reproducing apparatus becomes easier. Also, the reduced assembly steps consequently improves productivity when manufacturing.

The foregoing embodiments and advantages are merely exemplary and are not to be construed as limiting the present invention. The present invention can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A magnetic recording and reproducing apparatus, comprising:
    a deck mounted with a drum motor and a capstan shaft;
    a main sliding member slidably installed on the deck and being driven by a driving force of the drum motor;
    a pivot lever rotatably installed on the deck and supporting a pinch roller for guiding a tape to be in contact with the capstan shaft;
    a review arm rotatably installed on the deck and being connected to the pivot lever by means of an elastic member; and
    a compressing lever for connecting the review arm and the sliding member,
        wherein the compressing lever is driven by a driving force from the sliding member and compresses the review arm in a direction where the elastic member is stretched; and
        wherein the pivot lever is rotated by the stretched elastic member and adheres the pinch roller closely to the capstan shaft.

2. The apparatus according to claim 1, wherein the pivot lever and the review arm have the same rotation axis.

3. The apparatus according to claim 2, wherein the compressing lever comprises a coupling projection, and the main sliding member comprises a first cam opening for slidably engaging the coupling projection, whereby during the motion of the main sliding member, the coupling projection slides along the first cam opening and rotates the compressing lever.

4. The apparatus according to claim 3, wherein the review arm comprises a compressing projection, and the compressing lever comprises a second cam opening for slidably engaging the compressing projection, whereby during the rotation of the compressing lever, the compressing projection slides along the second cam opening and rotates the review arm.

5. The apparatus according to claim 4, wherein the compressing lever further comprises a pivot pin that is rotatably inserted into one end of the deck, and wherein the coupling projection of the compressing lever is disposed between the pivot pin and the second cam opening.

6. The apparatus according to claim 1, wherein one end of the review arm is combined coaxially with the pivot lever, and a review pole is disposed at the other end of the review arm for guiding the tape.

7. A driving method of a magnetic recording and reproducing apparatus, the method comprising the steps of:
    moving a pivot lever mounted with a pinch roller and loading a tape toward a capstan shaft;
    rotating a compressing lever installed on a deck supporting the capstan shaft;
    rotating a review arm connected to the compressing lever in one direction;
    rotating a pivot lever connected to the review arm by means of an elastic member; and
    compressing the pivot lever to closely adhere the tape to the capstan shaft and thereby providing a tension to the tape.

8. The method according to claim 7, wherein the pivot lever rotates about the same rotation axis with respect to the review arm.

9. The method according to claim 7, wherein the rotations of the review arm and the pivot lever occur substantially simultaneously.

10. The method according to claim 7, wherein the compressing step comprises the sub-steps of:
    applying tension to the tape by separating the review arm from the pivot lever and moving the review pole supported by the review arm; and
    elastically compressing the pivot member to the capstan shaft by means of the elastic member that is stretched by the separation of the review arm from the pivot lever.

11. The method according to claim 10, wherein the tension applying step comprises the sub-steps of:

rotating the review arm more than the pivot lever to separate the pivot lever and the review arm.

12. The method according to claim 7, further comprising the step of:
releasing the tension on the tape by releasing the adherence force between the tape and the capstan shaft.

13. The method according to claim 12, wherein the tension releasing step is performed in a tape stop mode.

14. The method according to claim 12, wherein the tension releasing step comprises the sub-steps of:
returning the compressing lever to a designated angle of an original position thereof on the deck with respect to the capstan shaft;
returning the review arm, that is connected to the compressing lever and supporting the tape-supporting review pole, in a direction toward the pivot lever; and
releasing tension of the elastic member connecting the pivot lever and the review arm, thereby releasing a compressing force of the pinch roller to the capstan shaft.

15. A driving method of a magnetic recording and reproducing apparatus comprising a pinch roller driven by a driving force from a drum motor to rotate a pivot lever and closely adhere a loaded tape on a deck to a capstan shaft, the method comprising the steps of:
rotating a compressing lever;
rotating a review arm connected to the compressing lever in one direction;
rotating the pivot lever connected to the review arm by means of an elastic member; and
adhering the tape closely to the capstan shaft by means of the pinch roller installed upon the pivot lever.

16. The method according to claim 15, further comprising the steps of:
stretching the elastic member by means of the rotation of the review arm; and
pulling the pivot lever by means of the stretching of the elastic member to closely adhere the tape to the capstan shaft.

* * * * *